United States Patent [19]

Cykowski

[11] 4,193,113

[45] Mar. 11, 1980

[54] KEYBOARD INTERRUPT METHOD AND APPARATUS

[75] Inventor: Mark F. Cykowski, Birmingham, Mich.

[73] Assignee: Burroughs Corporation, Detroit, Mich.

[21] Appl. No.: 969,112

[22] Filed: Dec. 13, 1978

Related U.S. Application Data

[63] Continuation of Ser. No. 582,272, May 30, 1975, abandoned.

[51] Int. Cl.² ........................ G06F 3/02; G06F 9/18
[52] U.S. Cl. ...................................................... 364/200
[58] Field of Search .... 364/200 MS file, 900 MS file, 364/300

[56] References Cited

U.S. PATENT DOCUMENTS

| | | | |
|---|---|---|---|
| 3,293,612 | 12/1966 | Ling | 364/200 |
| 3,568,164 | 3/1971 | Schiller | 364/200 |
| 3,601,810 | 8/1971 | Anderson et al. | 364/200 |
| 3,614,740 | 10/1971 | Delagi et al. | 364/200 |
| 3,618,037 | 11/1971 | Wollum et al. | 364/200 |
| 3,643,221 | 2/1972 | Chamber | 364/200 |
| 3,740,725 | 6/1973 | Fletcher et al. | 364/200 |
| 3,781,810 | 12/1973 | Downing | 364/200 |
| 3,905,025 | 9/1975 | Davis et al. | 364/200 |

*Primary Examiner*—Mark E. Nusbaum
*Attorney, Agent, or Firm*—Kevin R. Peterson; Edward J. Feeney, Jr.; James E. Ledbetter

[57] ABSTRACT

A method for interrupting the execution of a keyboard macroinstruction by a central processor to permit execution of non-keyboard macroinstructions when no external data is present in the central processor keyboard buffer. Auxiliary registers are provided mirroring critical registers used by the central processor for processing both keyboard and non-keyboard macroinstructions. The central processor interrogates the keyboard buffer to ascertain entered data. If no entered data is present, a non-keyboard macroinstruction is executed. If entered data is present, it is processed. Values are continuously exchanged between the auxiliary and critical registers to maintain the proper values for executing both keyboard and non-keyboard macroinstructions.

1 Claim, 7 Drawing Figures

```
            AL      1
            POS     10
            LKBR    LABEL
            TKM     20
   PRINT    POS     50
            RR
            PA      MESGE
            AL      1
            EX      B       4       PRINT
            KBEND
            POS     50
            PA      LABLE
            .
            .
            .
```

FIG. 3A.

FIXED KEYBOARD REGISTER LOCATIONS.

|  | UNITS | | | | | | | | |
|---|---|---|---|---|---|---|---|---|---|
| TENS | 0 | 1 | 2 | 3 | 4 | 5 | 6 | 7 | 8 |
| 0 | AR 0 | AR 1 | AR 2 | AR 3 | AR 4 | AR 5 | AR 6 | AR 7 | AR 8 |
| 1 | CAR 0 |  | CAR 2 |  | CAR 4 |  | CAR 6 |  | CAR 8 |
| 2 | MAR 0 |  | MAR 2 |  | MAR 4 |  | MAR 6 |  | MAR 8 |
| 3 | POS DES | FLAGS | SD | KT | FE | YX | IB LSR | PR | CUR POS |
| 4 | LT CNT | RT CNT | ST CNT | PKA | PKB | PKC | CF REG |  | SF REG |
| 5 | LT LMT | RT LMT | ST LMT | TRACE | POS ACT | CLOSE | SUB STK | LAST CST5 |  |
| 6 | S | U | B | R | O | U | T | I | N | E |
| 7 | WS BASE |  | SYSTEM 44 | SL5 IND |  | CLEAR 44 | TROUBLE 4 | WORK 1 | ACC 7 |
| 8 | MEM 27 | MEM 26 | MEM 25 | MEM 24 | MEM 23 | MEM 22 | MEM 21 | MEM 20 | MEM 17 |
| 9 | MEM 07 |  |  |  |  |  |  |  |  |
| A | OD X | L1 X | POS DES X | FLAGS X | SD X | KT X | FE X | YX X | LSR X |
| B |  |  | CLK PORT 4 | MAG PORT 4 | MMR PORT 4 | IN PORT 4 | OUT PORT 4 | CST PORT 4 | C96 PORT 4 |
| C | SYSTEM 84 | SYSTEM 74 | SYSTEM 64 | SYSTEM 54 | SYSTEM 4 | SYSTEM 34 | SYSTEM 24 | SYSTEM 14 |  |
| D | TAPE IN 3 |  | TAPE OUT 3 |  | CARD BUFF |  | MMR BUFF |  |  |
| E |  |  | CST LOAD |  | DMP BLOCK |  | DMP COUNT | DC ALOC (LSD) | (MSD) |
| F |  |  |  |  |  |  |  |  |  |

FIG. 3B.

FIXED KEYBOARD REGISTER LOCATIONS.

|  TENS \ UNITS | 9 | A | B | C | D | E | F |
|---|---|---|---|---|---|---|---|
| 0 | AR 9 | A | OP | L1 | L2 | E | F |
| 1 |  | CAR A |  | CAR C |  | FETCH A |  |
| 2 |  | RB ACT |  | KBX ACT |  | PC |  |
| 3 | XC REG | RCP | RCP KH | SCP | SCP KH | PN REG |  |
| 4 |  | RB REG |  | KB REG |  | DK REG |  |
| 5 | IR0 |  | IR1 |  | IR2 |  | IR3 |
| 6 | E |  | S | T | A | C | K |
| 7 | ACC 6 | ACC 5 | ACC 4 | ACC 3 | ACC 2 | ACC 1 | ACC 0 |
| 8 | MEM 16 | MEM 15 | MEM 14 | MEM 13 | MEM 12 | MEM 11 | MEM 10 |
| 9 |  |  |  |  |  |  |  |
| A |  | PP X | CUR POS X | XC REG X | CLEAR 14 |  |  |
| B |  | D96 PORT 4 | SS PORT 4 | AUX PORT 4 | APR PORT 4 | MS PORT 4 | CLEAR 34 | CLEAR 24 |
| C |  |  | S BASE |  |  |  | S LIMIT |  |
| D |  |  |  |  |  |  |  |
| E |  |  | SYSTEM 94 | SYS | TEM | AC | SCP LOWER | SCP UPPER |
| F |  |  |  |  |  |  |  |

FIG. 4.

|   | \ | UNITS | | | | | | | | | | | | | | |
|---|---|---|---|---|---|---|---|---|---|---|---|---|---|---|---|---|
|   | | 0 | 1 | 2 | 3 | 4 | 5 | 6 | 7 | 8 | 9 | A | B | C | D | E | F |
| TENS | 0 | | | | | | | | | | | | | | | | |
| | 1 | | | | | | | | | | | | | | | | |
| | 2 | | | | | | | | | | | | | | | | |
| | 3 | | | | | | | | | | | | | | | | |
| | 4 | | | | | | | | | | | | | | | | |
| | 5 | | | | | | | | | | | | | | | | |
| | 6 | | | | | | | | | | | | | | | | |
| | 7 | | | | | | | | | | | | | | | | |
| | 8 | | | | | | | | | | | | | | | | |
| | 9 | | | | | | | | | | | | | | | | |
| | A | | | | | | | | | | | | | | | | |
| | B | | | | | | | | | | | | | | | | |
| | C | | | | | | | | | | | | | | | | |
| | D | | | | | | | | | | | | | | | | |
| | E | | | | | | | | | | | | | | | | |
| | F | LI SAVE | KBFLG SAV | KT SAVE | L2 SAVE | RST RRFLG | | SAVE ADDR | | LKBR SAVE (SOFT ACUM) | | SCP SAVE | | KBACT SAVE | | POSDES FG | |

AUXILIARY KEYBOARD REGISTER LOCATIONS.

FIG. 5.

1. AUXILIARY ACCUMULATOR → TEMPORARY STORAGE AREA
   (SOFTACUM)                (ACCSAVE)

2. FIXED ACCUMULATOR → AUXILIARY ACCUMULATOR
   (ACCO)                (SOFTACUM)

3. TEMPORARY STORAGE AREA → FIXED ACCUMULATOR
   (ACCSAVE)                  (ACCO)

1. FIX KYBD REGISTERS → TEMPORARY STORAGE AREA $\begin{pmatrix} KBREG \\ SCP \\ KBACT \\ POSDES \& FLAGS \end{pmatrix}$ $\begin{pmatrix} MAR0 \\ MAR2 \\ MAR4 \\ MAR6 \end{pmatrix}$

2. AUXILIARY KYBD REGISTERS → FIXED KYBD REGISTERS $\begin{pmatrix} LKBRSAVE \\ SCP-SAVE \\ POSDESFG \\ KBACTSAV \end{pmatrix}$ $\begin{pmatrix} KBREG \\ SCP \\ POSDES \& FLAGS \\ KBACT \end{pmatrix}$

3. TEMPORARY STORAGE AREA → AUXILIARY KYBD REGISTERS $\begin{pmatrix} MAR0 \\ MAR2 \\ MAR4 \\ MAR6 \end{pmatrix}$ $\begin{pmatrix} LKBRSAVE \\ SCP-SAVE \\ KBACTSAV \\ POSDESFG \end{pmatrix}$

KEYBOARD INTERRUPT METHOD AND APPARATUS

This is a continuation of application Ser. No. 582,272, filed May 30, 1975 now abandoned.

BACKGROUND OF THE INVENTION

This invention relates broadly to data processing systems wherein a central processor unit communicates with several terminal units and more particularly to a method and associated apparatus for permitting the central processor to continue execution while data is being entered into it from the central processor keyboard. Thus, the present invention may be seen as an interrupt technique for interrupting a central processor to allow processing of data from a peripheral, its keyboard.

The subject invention is applicable to any computer system in which direct access to a keyboard or other peripheral buffer is possible. By direct access it is meant that the system can be programmed to interrogate the particular buffer to ascertain its contents and cause data to be sent to or accepted by the buffer. The invention is particularly applicable in adapting compact, relatively inexpensive, modularized central processing units to communicate with and process data from a number of terminal units. Such processors commonly employ microprogramming and a firmware control section.

Because of design and cost considerations, such central processors (CPU's) have been organized such that all processing is halted when a keyboard entry is required at the central processor. This organization can be very undesirable when the CPU is to be used to communicate with a number of terminal units.

To illustrate further, the central processor may be executing a program when certain data needs to be entered from the central processor station. A keyboard macroinstruction would therefore occur in the CPU macroprogram sequence. This instruction may cause all of the associated terminal units to be inoperative during the duration of the keyboard input to the central processor. Hence, valuable computer time is wasted, and undesirable "hang-ups" occur at terminal units to the dissatisfaction of the users. Because the speed of manual data input through the central processor keyboard is relatively slow, many computer instructions could be executed during intervals in which no data exists in the keyboard input buffer. However, it has been heretofore impossible to efficiently utilize the time period.

Prior art interrupt techniques have been peripheral oriented. The interrupts have been generated by the peripheral terminal raising a hardware signal requesting the CPU's service. Thus, a special interruption mechanism must be built into the CPU-terminal system. Where it is desired to adapt a CPU and terminal which have not been commonly designed, the prior art interrupt mechanism is of little help. The prior art technique is particularly inappropriate for providing an interrupt mechanism between a CPU and its own keyboard in a small CPU-terminal system as described above.

SUMMARY OF THE INVENTION

It is therefore an object of the invention to provide an interrupt technique which does not depend on signaling by a peripheral device seeking service.

It is another object of the invention to provide a method for interrupting the execution of keyboard macroinstructions by a central processing unit in order to permit execution of the other program macroinstructions.

It is yet another object of the invention to provide such an interrupt method requiring a minimum amount of additional storage space in the central processing unit and a minimal amount of auxiliary apparatus.

These and other objects and advantages of the invention are accomplished by having the CPU interrogate the peripheral keyboard buffer to determine if the buffer requires service. If data is present in the buffer it is processed; if not, another macroinstruction is executed by the CPU. Auxiliary registers mirroring critical fixed CPU registers are provided. The critical fixed CPU registers are those which may be used in both execution of macroinstructions and processing of buffer data. According to the invention, their contents are exchanged with the mirroring auxiliary registers at crucial processing points in order to preserve proper register contents for both buffer data processing and macroinstruction execution.

BRIEF DESCRIPTION OF THE DRAWINGS

Other objects and advantages of the subject invention will be apparent after a consideration of the following description of the preferred embodiment taken in conjunction with the drawings of which:

FIGS. 3A and 3B illustrate in more detail the fixed keyboard register shown in FIG. 1.

FIG. 4 illustrates in more detail the auxiliary register shown in FIG. 1.

FIG. 5 illustrates register exchanges utilized in the preferred embodiment of the invention.

DETAILED DESCRIPTION OF THE PREFERRED EMBODIMENT

Figures 1, 6:
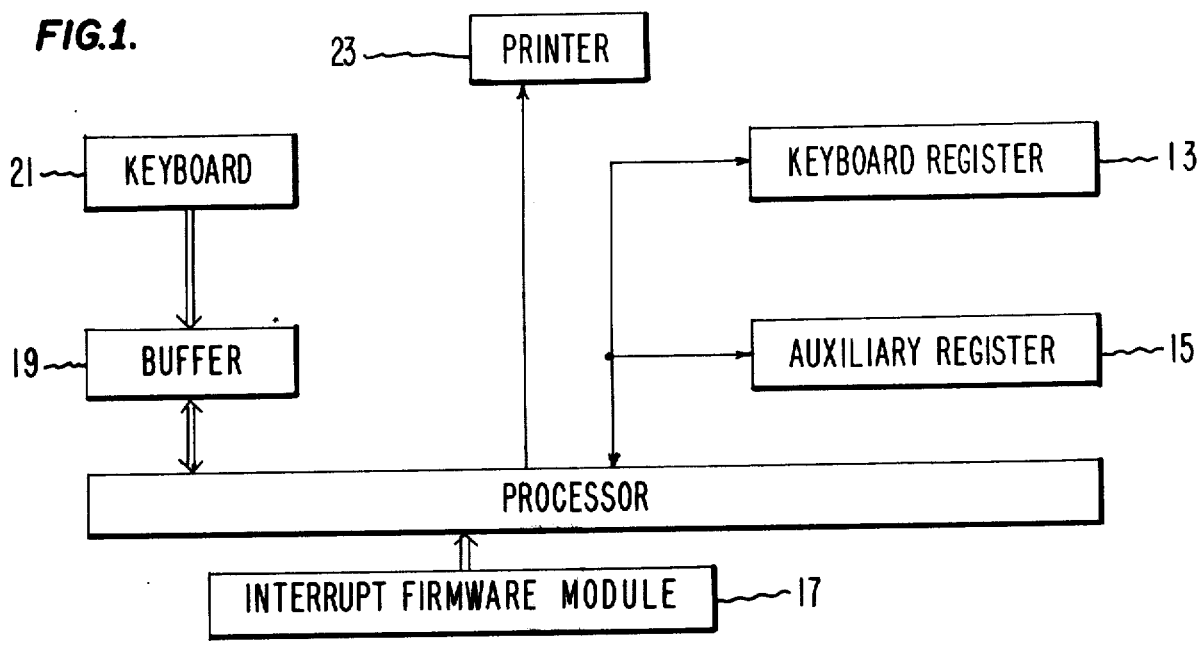
FIG. 1 is a schematic block diagram of apparatus used in the preferred embodiment of the invention.
FIG. 6 is an exemplary macroinstruction routine wherein keyboard interrupts occur.

A data processor to which the subject invention is applicable is shown in FIG. 1. The structure and operation of such processors are illustrated in M. Malmer Jr., et al, U.S. Pat. No. 3,725,868 and Rasche et al, U.S. Pat. No. 3,579,192, both assigned to the present assignee. Such processors include a keyboard 21 interfacing with a keyboard buffer 19 and a group of storage registers including a fixed keyboard register 13. Particular keyboard apparatus to which the subject invention is applicable is illustrated in U.S. Pat. No. 3,533,078 issued to C. C. Perkins et al. and assigned to the present assignee. Data typed in from the keyboard 21 is transferred into the keyboard buffer 19. The data in the buffer 19 may be printed out on a character printer 23 or otherwise processed by the system firmware.

Auxiliary storage locations 15 are provided mirroring critical registers of the fixed keyboard register 13 of the central processing unit. These critical registers are ones which may be utilized in processing both keyboard and non-keyboard macroinstructions. Certain microcommands are then added to the processor firmware section by means of a keyboard interrupt module 17 to control the execution of a keyboard macroinstruction. They then become a permanent part of the control structure of the processor. These microcommands cause the keyboard input buffer to be monitored by the CPU and any data present therein to be processed. If no data is present in the buffer, execution of another macroinstruction is permitted. During intermittent testing of the keyboard buffer and execution of other non-keyboard macroinstructions, the contents of the critical fixed keyboard registers are continuously interchanged with the auxiliary keyboard register 15 to maintain the proper values for execution of keyboard processing steps and for execution of other non-keyboard macroinstructions in the macroprogram. The particular utility of this scheme of operation will be apparent after the ensuing more detailed explanation.

In the course of processing the contents of the keyboard buffer 19, the system firmware of the CPU utilizes storage locations in the fixed keyboard register 13. For example, the basic system firmware may use the values in particular storage locations within fixed keyboard register 13 to calculate print ball positioning, keyboard errors and memory locations of entered data. Whenever the basic firmware is used to process characters from the keyboard buffer 19, the contents of the keyboard register 13 must reflect the correct values needed by the keyboard instruction being interrupted. If the keyboard instruction is to be interrupted to allow processing of non-keyboard macrocommands, the values may be altered such that when processing of the interrupted keyboard command is resumed, incorrect values are present. Therefore, the contents of the registers used in processing the keyboard macroinstructions must be kept separate from the register values used by a non-keyboard macroinstruction during the interrupt. According to the invention, this separation is accomplished by exchanging the values in the fixed keyboard register 13 with the auxiliary keyboard register 15 before data in the keyboard buffer 19 is processed and after the keyboard 19 is empty or a termination code is found.

The coordination of exchange operations with the execution of non-keyboard and keyboard macrocommands is accomplished by additional control microinstructions supplied by keyboard interrupt module 17. This module 17 is called into play upon occurrence of a keyboard macroinstruction. Such an instruction normally calls the basic firmware microroutine for executing the required keyboard interaction. According to the invention, a bit in the basic system register (bit 7 of memory cell 00C4) indicates whether the keyboard interrupt module 17 assumes control of the macroprogram flow or not.

Figure 2:
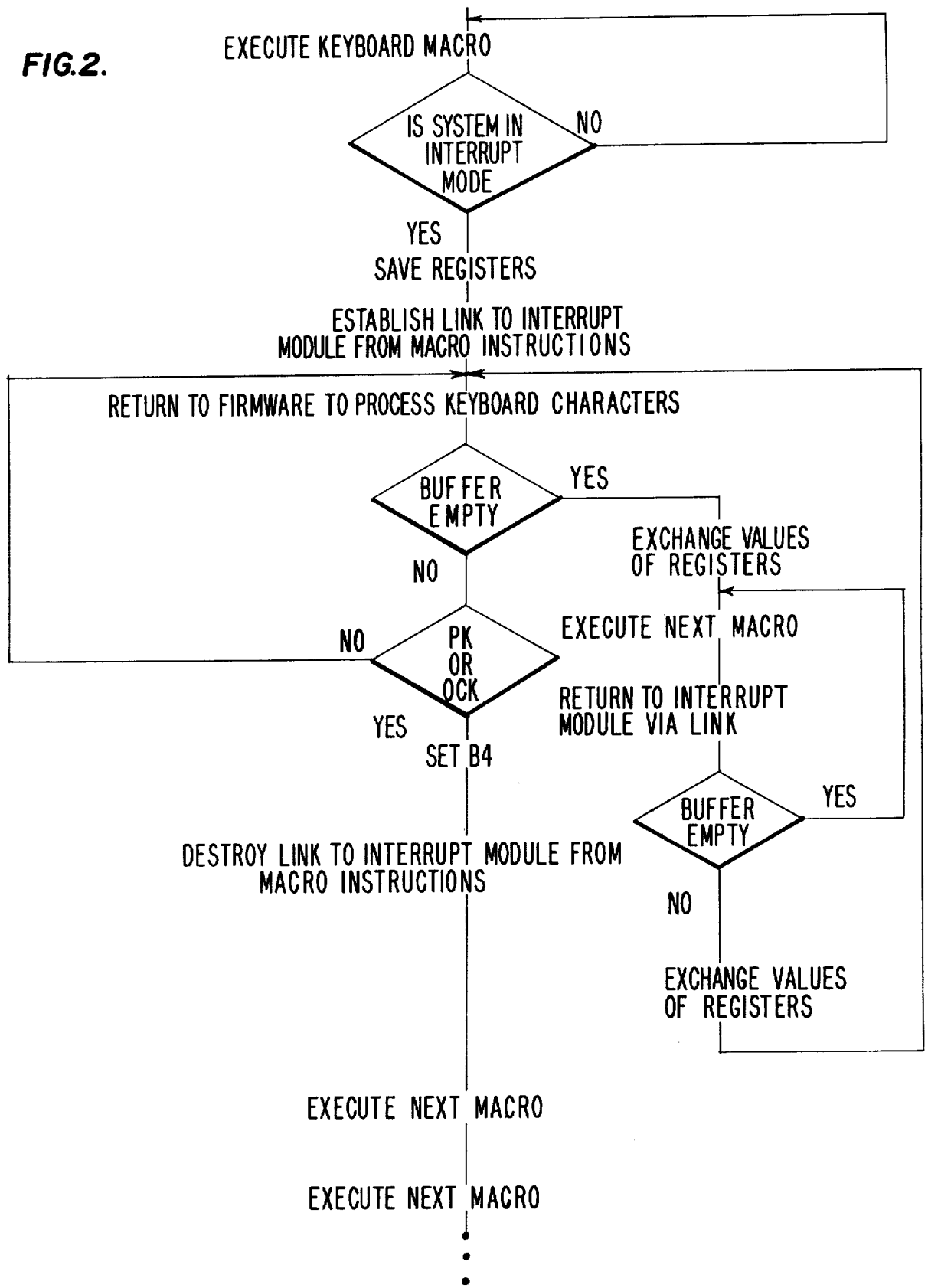
FIG. 2 is a flow diagram illustrating the interrupt method of the preferred embodiment of the invention.

The operation effected by the interrupt module 17 in conjunction with the auxiliary register 15 is shown in more detail in the flow diagram of FIG. 2. Initially, the module 17 copies the contents of the keyboard registers into auxiliary keyboard register locations. The module 17 also copies the address indicating the next microinstruction string to be executed in accomplishing the macroprogram into an auxiliary location. It substitutes for that address the address of the routine stored in the CPU memory which checks the hardwrd keyboard buffer 19 for data. Control is then passed back to the basic processor firmware keyboard routine, which interrogates the keyboard buffer. Preferably, the control module 17 uses the buffer sampling routine in the basic CPU firmware as a subrountine in order to save memory.

The module 17 may then institute two alternative actions, depending on the status of the buffer 19. If the interrogation should indicate characters present in the keyboard buffer 19, the basic keyboard routine stored in the CPU processes these characters unless they indicate a termination of the keyboard operation. If the interrogation indicates the buffer 19 is empty, another interrupting non-keyboard macroinstruction may be performed. In this case, the values in the auxiliary keyboard register 15 are exchanged with those in the fixed keyboard register 13. In this manner, any data being used by or derived from previous non-keyboard macroinstruction execution and necessary for execution of the interrupting macroinstruction is returned to its original position in the fixed keyboard register 13.

The central processor fetch cycle is then performed on the next macroinstruction. In the preferred embodiment of the invention the fetch cycle includes decoding of an operation code, calculating the length of the instruction, calculating a program counter for indicating the address of the next operation code and branching to the microstring which executes the associated macroinstruction. The last microinstruction in the string calls the address of the next microroutine to be executed.

As before indicated, that address of the next microinstruction was initially replaced by the address of the keyboard interrupt module firmware 17, which reinstitutes checking of the hardware keyboard buffer 19 for entered data. If the buffer 19 is empty, the next non-keyboard marcoinstruction is executed without any exchange of values between the critical registers and the auxiliary registers, as shown in the flow diagram of FIG. 2. Again, the fetch cycle is performed, and the terminating microinstruction calls the keyboard interrupt module 17. However, if the buffer 19 is not empty, i.e. some data has been entered during processing of an interrupting macroinstruction, the entered data is processed.

To process this data, the fixed and auxiliary register values must again be exchanged to assure proper values for processing the keyboard buffer data as shown in the flow diagram in FIG. 2. After this exchange, control is again given back to the basic firmware keyboard routine to process the keyboard data until the buffer is again empty or a terminating key code is found in the keyboard buffer.

The interrupt mode ends when a terminating code is found in the keyboard buffer. The code may be an operation control key OCK or enabled program key PK. When the basic firmware keyboard routine finds a terminating code, control is passed to the interrupt module (see routine SETB4 in the appended microprogram LISTING). According to the LISTING, this routine sets the macroprogram B4 flag, exchanges registers, exchanges the KT flags with the saved KT flags (KTSAVE), saves the terminator code in L2SAVE, and restores to FETCHA the address of fetch (move SAVEADDR to FETCHA). As a result, the keyboard interrupt is deactivated. Therefore, the keyboard interrupt is ended whenever the terminator code is found in the keyboard buffer.

For a more specific application of the preferred embodiment of the invention, one may consider its implementation into a prior art central processor and terminal system, such as the Burroughs L 8000 system.

The fixed keyboard register 13 in the L 8000 system is shown in FIGS. 3A and 3B and the auxiliary register locations 15 used are illustrated in FIG. 4. In the register complex of FIGS. 3A and 3B, there are 6 registers that the keyboard routine uses for processing data from the console keyboard buffer 19. These registers can be altered by the microprogram after initiating a keyboard instruction. They are the registers denoted KBACT, KBREG, FLAGS, POSDES, SCP, ACCO. The first five are pertinent only to alpha keyboard commands and the last to numeric keyboard commands. KBACT points to the exact character where data will be typed for input instructions denoted TKM and EAM and KBREG points to the most significant character of a word. The character pointer register SCP=(KBACT−KBREG). (1 word=8 characters). The register POSDES is the desired position register, which indicates print ball positioning for the character printer. The flags register FLAGS indicates red ribbon and previous ribbon flags. The fixed accumulator ACCO is a 16 digit register (8 characters) whose digit positions are numbered 0-15. 0=least significant digit (LSD) and 15=most significant digit (MSD). ACCO points to the LSD of the fixed accumulator.

Since the contents of these six registers KBACT, KBREG, POSDES, FLAGS, SCP, ACCO are used by the keyboard routine and also may be altered by microprogram execution, it is necessary according to the invention to exchange these registers' contents with those of the auxiliary registers. In the preferred embodiment, this exchange is accomplished by a test keyboard subroutine TESTKYBD. This routine tests the operation (OP) code of a keyboard macroinstruction to determine if an alpha or numeric keyboard command is being executed. If the command is a numeric keyboard command, the fixed accumulator ACCO is exchanged with the auxiliary accumulator. If the command is an alpha keyboard command, the fixed keyboard registers are exchanged with the auxiliary keyboard registers. These exchanges are shown in FIG. 5. The list of macroinstructions in FIG. 6 may be used to illustrate how the above keyboard register locations and auxiliary register locations interact during execution of a macroinstruction string. The following description lists each of the macroinstructions of FIG. 6 and the operation it defines. After the definition, the interaction of the interrupt technique previously described is explained.

Al 1 Advance platen 1 line (Space paper up 1 line).

POS 10 Move 10 to desired position register (POSDES).

LKBR LABEL Move address of LABEL to keyboard base registers (KBREG & KBACT). This address is the starting memory word location into which data for a subsequent keyboard entry, e.g., TKM will be loaded.

TKM 20 (KEYBOARD MACRO) Accept into memory and print up to 20 alphanumeric keys from the alpha keyboard 21. Under normal execution firmware would wait until all keys were entered and terminated before executing the next macroinstruction. According to the invention certain registers including POSDES, KBREG and KBACT are saved, a link to the interrupt module control 17 established, the keyboard buffer 19 tested, and any characters entered processed.

When a keyboard macro is executed, a test for keyboard interrupt control is made at the top of the common micro-string used to execute the keyboard macroinstruction. If the bit indicating keyboard interrupt is "on," control is passed to the interrupt control module 17 for initial setup. If the bit is "off," no setup is done and control stays in the keyboard micro routine until a termination key is depressed. The bit which tells a keyboard instruction whether to interrupt or not interrupt is set or reset before the program is executed. It cannot be altered in any way during program execution. A program written for normal keyboard instruction execution cannot be expected to run with the keyboard interrupt and vice versa.

If the keyboard interrupt bit is set, the interrupt control module 17 micro-string sets up by copying the six key registers which alpha keyboards use in order to process data correctly to a location in the auxiliary keyboard register 15. (See FIG. 5).

The vehicle for interrupting the fetch cycle is also established during the setup. This vehicle is established by copying the address of fetch from the register FETCHA (FIG. 3) to the register FETCHA the address of the routine in the interrupt control module 17 which checks the hardware buffer 19 for data. Hence, when the basic control processor firmware executes microinstruction denoted BRS (6E) on the address in the register FETCHA, control is passed to the interrupt module 17 instead of to fetch. The instruction BRS (6E) causes the address in the FETCHA register to be put into the Command Address Register CAR. The address in the command address register CAR determines the next microinstruction to be executed. The address placed in CAR is that of a microstring included in the interrupt control module 17. Every macroinstruction will return to this microstring after the keyboard interrupt mode is initiated. Once the setup is complete, control is returned to the basic firmware keyboard routine by the control module firmware.

POS 50 The value 50 is to be moved to POSDES. Control is returned to the keyboard interrupt module 17. The interrupt module 17 tests the keyboard FIFO buffer 19 before the basic keyboard firmware routine. If data is in the buffer 19, control is passed to the basic firmware keyboard routine for processing. If there is no data, then control is passed back to fetch to execute the next macroinstruction. Suppose that there are two characters of data entered pursuant to the previous instruction TKM. The data should be validated and printed on the console 23. However, the characters must be printed starting at position 10 as indicated by the previous instruction POS 10. Since 10 was saved in POSDESFG and POSDES now equals 50, the registers POSDES and POSDESFG must be exchanged so that when the characters are printed by the basic central processor firmware, they are printed in the correct position (basic firmware uses POSDES to tell where to print). This exchange is accomplished by the TESTKBD instruction string, part of the interrupt control module 17. When the keyboard buffer 19 is empty and all the characters are printed, the registers POSDES and POSDESFG are exchanged again by TESTKYBD. If two characters were printed, POSDES equals 50 and POSDESFG equals 12. Since the buffer is now empty, control is returned to fetch.

RR Set bit to reverse ribbon color. The module control firmware again tests for data in the keyboard buffer 19. If there is no data, control is returned to fetch.

PA MESGE Print the alpha character from memory location MESGE. The characters in MESGE will be printed starting at position 50. After the print, control is passed to the keyboard module 17 in order to test for keyboard data. Suppose two more characters were entered from the keyboard. If MESGE were 20 characters, POSACT would equal 70. In order to print the 2 characters entered from the keyboard, POSDES and POSDESFG must again be exchanged. POSDES now equals 12. The print ball must then position 58 to the left in order to print. When printing of the two characters entered from the keyboard is complete, POSDES and POSDESFG are exchanged again. When the keyboard buffer is empty control is returned to fetch.

A1 1 Space up 1 line. Test keyboard buffer for data. If no data is found, control is returned to fetch.

EX B 4PRINT Test B4 flag. The B4 flag controls termination of control by the interrupt module 17. As long as no operation control key (OCK) indicating termination of keyboard entry has been entered from the keyboard, the B4 flag is reset. In this case a test is performed for keyboard data. If no data is found, control is again returned to fetch. The next macroinstruction to be executed is at label PRINT. Suppose however that the B4 flag is set. The interrupt control module 17 is then "deactivated" and control is returned to fetch. (Note that EX B4 PRINT does not deactivate the keyboard interrupt module. The termination code deactivates the module and that could come at any time between the TK M 20 and the EX B4 PRINT).

Upon deactivation of the keyboard interrupt mode, the address of fetch (stored in SAVEADDR) is now moved back to the register FETCHA in the keyboard register 15, thus destroying the link to the keyboard interrupt module previously set up. Now, execution of a BRS (6E) microinstruction on the address in the register FETCHA will return to the central processor fetch cycle instead of the interrupt module control.

KBEND Keyboard complete instruction. A final exchange of registers is performed. Thereafter, macroinstructions will be executed in sequence without any interrupt until another keyboard instruction is encountered.

POS 50 Move 50 to POSDES.

PA LABEL Print the characters as they were entered into memory from the keyboard.

The above example is intended as an illustration only. The method of the invention may be performed at the microlevel as particularly illustrated or at higher levels depending upon the particular central processor under consideration. In any event, one of ordinary skill in the art would easily be able to implement the control instructions required to perform the operations necessary to implement the invention, such as exchanging of registers and testing a peripheral buffer. The appended LISTING illustrates a COBOL routine for implementing the invention. It is therefore to be understood that, within the scope of the appended claims, the invention may be practiced other than as specifically detailed above.

| LISTING |
|---|
| IDENTIFICATION DIVISION |
| PROGRAM - ID. - KEYBOARD - INTERRUPT. |
| AUTHOR: MARK F. CYKOWSKI |
| INSTALLATION: BURROUGHS CORPORATION |
| DATE-WRITTEN: 4/8/75 |
| DATE COMPILED |
| SECURITY |
| REMARKS |
| ENVIRONMENT DIVISION. |
| CONFIGURATION SECTION. |
| SOURCE-COMPUTER. |
| OBJECT-COMPUTER. |
| INPUT-OUTPUT SECTION. |
|     SELECT KYBD ASSIGN TO CONSOLE-KYBD |
| I-O-CONTROL. |
| DATA DIVISION. |
| FILE SECTION. |
| FD KYBD. |

| -continued |
|---|
| LISTING |
| 01 KYBD-REGS. |
|   03 KBREG PC 99. |
|   03 SCP PC 99. |
|   03 KBACT PC 99. |
|   03 POSDES PC 99. |
|   03 ACCUMULATOR PC 9(8). |
|   03 L1    PC X. |
|   03 A     PC X. |
|   03 KT |
|     05 K PC 9 CMP. |
|     05 T PC 9 CMP. |
|   03 POSACT PC 9. |
|   03 OPCODE |
|     05 OP-UPPER PC 9 CMP. |
|     05 OP-LOWER PC 9 CMP. |
|   03 LSR   PC X. |
|   03 L2    PC X. |
| WORKING-STORAGE SECTION. |
| 77 OP-SAVE PC X. |
| 77 FLAG PC 9. |
| 77 L1 SAVE PC X. |
| 77 KBFLGSAV PC X. |
| 77 RSTRRFLG PC X. |
| 77 BRANCH-TABLE PC 9. |
| 77 BR-TBL-SAVE PC 9. |
| 77 L2 SAVE PC X. |
| 77 TEMP-ACCUM PC 9(8). |
| 77 AUX-ACCUM PC 9(8). |
| 01 KTSAVE. |
|   03 KSAVE PC 9 CMP |
|   03 TSAVE PC 9 CMP. |
| 01 A-REG. |
|   03 A-REG-UPPER PC 9 CMP. |
|   03 A-REG-LOWER PC 9 CMP. |
| 01 HEX-LITERALS. |
|   03 A PC 9 CMP VA @A@. |
|   03 B PC 9 CMP VA @B@. |
|   03 C PC 9 CMP VA @C@. |
|   03 E PC 9 CMP VA @E@. |
| 01 TEMP-REGS. |
|   03 TEMP-KBREG PC 99. |
|   03 TEMP-SCP PC 99. |
|   03 TEMP-KBACT PC 99. |
|   03 TEMP-POSDES PC 99. |
| 01 AUX-REGS. |
|   03 AUX-KBREG PC 99. |
|   03 AUX-SCP PC 99. |
|   03 AUX-KBACT PC 99. |
|   03 AUX-POSDES PC 99. |
| PROCEDURE DIVISION. |
| START. |
|   MOVE ZERO TO FLAG. |
|   IF A-REG EQUAL TO 3 |
|     GO TO KBEND. |
|   IF A-REG EQUAL TO ZERO |
|     GO TO KYBDSAVE. |
|   PERFORM TESTKYBD. |
|   IF A-REG EQUAL TO 2 |
|     GO TO SETB4. |
| SAVEL1 FG. |
|   MOVE L1 to L1 SAVE |
|   MOVE A TO KBFLGSAV. |
|   IF RSTRRFLG EQUAL TO ZERO. |
|     GO TO RETURN. |
|   SUBBTRACT 8 FROM RSTRRFLG. |
|   GO TO RETURN. |
| KYBDSAVE. |
|   MOVE 1 to FLAG. |
|   PERFORM XCHM-TK |
|   PERFORM TESTKYBD. |
|   MOVE BRANCH-TABLE TO BR-TBL-SAVE |
|   MOVE KT TO KTSAVE. |
|   MOVE 5 TO BRANCH-TABLE. |
|   IF BRANCH-TABLE EQUAL TO BR-TBL-SAVE |
|     GO TO INITIALIZE |
|     ELSE EXIT. |
| RESTORE. |
|   MOVE KT TO KTSAVE. |
|   READ KYBD-STATUS. |
|   IF KYBD EMPTY |
|     THEN READ KYBD-STATUS |

-continued
LISTING

```
        IF KYBD LOCKED
            GO TO RESTOR L1
            ELSE GO TO RETURN.
RESTORE L1.
        MOVE LISAVE to L1.
        IF POSACT NOT EQUAL AUX-POSDES
            ADD 1 TO KBFLGSAV.
        MOVE KBFLGSAV TO A.
        IF OPCODE EQUAL TO 7
            MOVE ZERO TO RSTRRFLG.
            ELSE MOVE 1 TO RSTRRFLG.
        MOVE OP-SAVE TO OPCODE.
        PERFORM TESTKYBD.
        IF OP-UPPER EQUAL TO B
            MOVE 3 to BRANCH-TABLE
            G O TO BEGIN.
        IF OP-LOWER LESS THAN 8.
            MOVE 5 to BRANCH-TABLE
            ELSE MOVE 4 to BRANCH-TABLE.
        GO TO BEGIN.
KBEND.
        IF L1 NOT EQUAL TO 1 EXT.
        MOVE LSR TO A-REG.
        IF A-REG-UPPER EQUAL TO 0 OR 2.
        OR 4 OR 6 OR 8 OR A OR C OR E.
        GO TO BEGIN.
        SUBTRACT 1 FROM A-REG-UPPER.
        MOVE A-REG TO LSR.
        MOVE OP-SAVE TO A-REG.
        PERFORM TEST.
        MOVE K SAVE TO K.
        MOVE L2 SAVE TO A-REG.
        IF A-REG-UPPER GREATER THAN 7
            GO TO BEGIN.
        MOVE 6 TO BRANCH-TABLE.
        GO TO BEGIN.
SET B4.
        ADD 10 TO LSR.
        MOVE L2 TO L2 SAVE.
        MOVE KTSAVE TO A-REG.
        MOVE KT TO KTSAVE.
        MOVE A-REG TO KT.
        MOVE BR-TBL-SAVE BRANCH-TABLE.
        GO TO BEGIN.
TESTKYBD.
        IF OP-LOWER GREATER THAN 7
            GO TO XCHM-TK.
XCHMACCM.
        MOVE ACCUMULATOR TO TEMP-ACCUM.
        MOVE AUX-ACCUM TO ACCUMULATOR.
        MOVE TEMP-ACCUM TO AUX-ACCUM.
XCHM-TK.
        MOVE KBREG TO TEMP-KBREG.
        MOVE SCP TO TEMP-SCP.
        MOVE KBACT TO TEMP-KBACT.
        MOVE POSDES TO TEMP-POSDES.
        IF FLAG EQUAL TO 1
            GO TO SAVE.
        MOVE AUX-KBREG TO KBREG.
        MOVE AUX-SCP TO SCP.
        MOVE AUX-KBACT TO KBACT.
        MOVE AUX-POSDES TO POSDES.
SAVE.
        MOVE TEMP-REGS TO AUX-REGS.
        MOVE 0 TO FLAG.
        EXIT.
BEGIN.
        GO TO FETCH TUSCAN PAPER-TAPE-KYBD
        ALPHA-KYBD NUMERIC-KYBD
```

-continued
LISTING

```
        PK-END RESTORE
            DEPENDING ON BRANCH-TABLE
RETURN
        GO TO FETCH TUSCAN
        DEPENDING ON BR-TBL-SAVE.
```

What is claimed is:

1. In a data processing system comprising a central processor for executing keyboard and non-keyboard macro-instructions under firmware control, a keyboard, a keyboard buffer coupling said keyboard to said central processor, a keyboard register having a set of register locations altered by the execution of both keyboard and non-keyboard macro-instructions, a plurality of auxiliary registers and a plurality of temporary registers, each of said registers being coupled to said central processor, a method of interrupting the performance of a keyboard macro-instruction to allow the processing of other non-keyboard macro-instructions by transferring between the keyboard register, the temporary registers and the auxiliary registers the contents of said set of register locations in said keyboard register which are altered by both keyboard and non-keyboard macro-instruction to insure the proper information is stored in said set of register locations during the execution of both keyboard and non-keyboard macro-instructions, said method comprising the steps of:

(1) testing said keyboard buffer to ascertain whether entered data is present in said keyboard buffer;

(2) processing said entered data and repeating step (1) if said testing indicates the presence of entered data;

(3) transferring the contents of said set of register locations in said keyboard register to said temporary registers;

(4) transferring the contents of said auxiliary registers to said set of register locations in said keyboard register;

(5) transferring the contents of said temporary registers to said auxiliary registers;

(6) interrupting the processing of a keyboard macro-instruction to execute a non-keyboard macro-instruction;

(7) testing said keyboard buffer to ascertain whether data is present in said buffer;

(8) executing a succeeding non-keyboard macro-instruction and repeating step (7) if the testing indicates no entered data in said keyboard buffer;

(9) transferring the contents of said set of register locations in said keyboard register from said keyboard register to said temporary registers;

(10) transferring the contents of said auxiliary registers to said set of register locations in said keyboard register;

(11) transferring the contents of said temporary registers to said auxiliary registers;

(12) processing said data entered into said keyboard buffer; and

(13) continually repeating steps (1) through (12).

* * * * *

UNITED STATES PATENT AND TRADEMARK OFFICE
CERTIFICATE OF CORRECTION

PATENT NO. : 4,193,113
DATED : March 11, 1980
INVENTOR(S) : Mark F. Cykowski

It is certified that error appears in the above—identified patent and that said Letters Patent is hereby corrected as shown below:

Column 5, line 1, "microprogram" should read -- macroprogram --.

Column 5, line 21, "micro" should read -- macro --.

Column 9, line 40, "MOVE BR-TBL-SAVE BRANCH TABLE" should read -- MOVE BR-TBL-SAVE TO BRANCH TABLE --.

Signed and Sealed this

Twenty-second Day of July 1980

[SEAL]

Attest:

SIDNEY A. DIAMOND

Attesting Officer

Commissioner of Patents and Trademarks